United States Patent Office 3,546,273
Patented Dec. 8, 1970

---

3,546,273
ESTER DERIVATIVES OF 2-(4-HALOPHENOXY) ALKANOIC ACIDS
William A. Bolhofer, Frederick, Pa., assignor to Merck & Co., Inc., Rahway, N.J., a corporation of New Jersey
No Drawing. Filed June 1, 1967, Ser. No. 642,733
Int. Cl. C07c 69/76, 93/16
U.S. Cl. 260—473
8 Claims

ABSTRACT OF THE DISCLOSURE 2-(4-halophenoxy)alkanoic acid ester products (I) which contain an amido, ureido or benzoyl group in the alkanol portion of the molecule. The said esters are obtained from their corresponding 2-(4-halophenoxy) alkanoic acid halides via the reaction with an appropriate amido, ureido or benzoyl substituted alkanol; or the said benzoyl substituted esters may be obtained via the reaction of a 2-(4-halophenoxy)alkanoic acid with an appropriate phenacyl halide. The said ester products (I) are useful as hypocholesterolemics in the treatment of atherosclerosis.

---

This invention relates to 2-(4-halophenoxy)alkanoic acid esters which are substituted in the alkanol portion of the molecule by an amido, ureido or phenacyl moiety.

Studies show that cholesterol and triglyceride play a major role in the formation of atherosclerotic plaques by accelerating the deposition of blood lipids in the arterial wall. It is the purpose of this invention to disclose a new class of chemical compounds which effectively reduce the concentration of cholesterol, triglycerides and other lipids in blood serum and, therefore, ameliorate conditions associated with blood lipid deposition.

The instant 2-(4-halophenoxy)alkanoic acid esters are products having the following general formula:

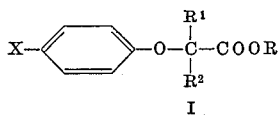

I wherein R is lower alkanamido substituted lower alkyl, for example, formamidoethyl, acetamidoethyl, acetamidopropyl, propionamidoethyl, etc, benzamido substituted lower alkyl, for example, benzamidoethyl, benzamidopropyl, etc., phenacyl, mononuclear substituted phenacyl wherein the nuclear substituent is an halogen, lower alkyl or lower alkoxy radical, ureido substituted lower alkyl, for example, ureidoethyl, (1-methyl-2-ureido)ethyl, i.e., —CH(CH₃)CH₂—NH—CO—NH₂, etc., or N'-lower alkyl-ureido substituted lower alkyl, i.e., —C$_n$H$_{2n}$—NH—CO—NHR³ wherein R³ is lower alkyl and n is an integer having a value of 1–3 as, for example, N'-ethylureidoethyl, N'-ethylureidopropyl, etc., N',N'-di-lower alkyl-ureido substituted lower alkyl, i.e., —C$_n$H$_{2n}$—NH—CO—NR³R³ wherein R³ and n are as defined above, for example, N', N'-dimethylureidomethyl, etc.; R¹ and R² are the same or different lower alkyl radicals or, taken together with the carbon atom to which they are attached, R¹ and R² may be joined to form a six-membered cycloalkyl ring; and X is halogen, for example, chloro, bromo, fluoro or iodo.

A preferred embodiment of this invention relates to 2-(4-halophenoxy) - 2 - methylpropionates wherein the alkanol portion of the said ester is substituted by a lower alkanamido or ureido group:

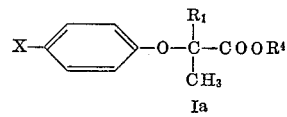

Ia wherein R⁴ is lower alkanamido substituted lower alkyl, for example, acetamidoethyl, etc. or ureido substituted lower alkyl, for example, ureidoethyl and X is an defined above. The foregoing class of compounds exhibits particularly good hypocholesterolemic and hypolipemic activity and represents a preferred subgroup within the scope of this invention.

The instant products (I) are conveniently prepared by the reaction of a 2-(4-halophenoxy)alkanoic acid halide (II, infra) with an appropriately substituted alkanol. Preferably, the reaction is conducted in a solvent which is substantially inert with respect to the reactants employed as, for example, in dimethylformamide to which has been added a small amount of pyridine, or in tetrahydrofuran, etc. The following equation wherein the starting material is a 2-(4-halophenoxy)alkanoic acid chloride illustrates this method of prepartion; however, it is to be understood that other acid halides such as the 2-(4-halophenoxy)alkanoic acid bromide, etc. may also be employed in an analogous manner to obtain an identical product:

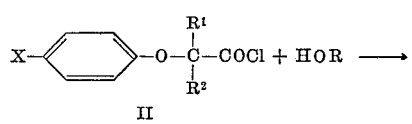

II

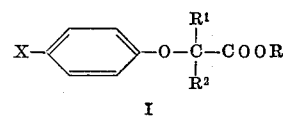

I wherein R, R¹, R² and X are as defined above.

An alternate method for the preparation of those products which contain a phenacyl or monounclear substituted phenacyl group in the alkanol portion of the molecule consists in treating a 2-(4-halophenoxy)alkanoic acid (III, infra) with an appropriately substituted phenacyl halide in the presence of a equivalent amount of a base such as an alkali metal alkoxide, etc. The process may be conducted at ambient temperatures but, generally, it is desirable to facilitate the reaction by the application of heat as, for example, by heating under reflux for several hours. The following equation illustrates this method of preparation:

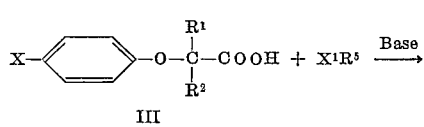

III

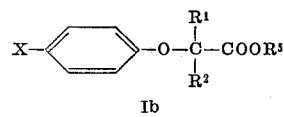

Ib wherein R⁵ is phenacyl or mononuclear substituted phenacyl wherein the nuclear substituent is an halogen, lower alkyl or lower alkoxy radical; $X^1$ is halogen, for example, chloro, bromo, etc. and $R^1$, $R^2$ and X are as defined above.

The ester products (I) of this invention are generally obtained as crystalline solids which may be purified by recrystallization from a suitable solvent or from a mixture of solvents as, for example, from toluene, isopropyl ether, isopropyl alcohol, n-butyl chloride or mixtures thereof.

The 2-(4-halophenoxy)alkanoic acid (III) and corresponding acid halide (II) starting materials of the foregoing processes are either known compounds or may be obtained by methods which are known to those skilled in the art. Thus, for example, by treating an alkali metal salt of an appropriate phenol (IV, infra) with a suitable haloalkanoic acid ester in an alcoholic medium the corresponding 2-(4-halophenoxy)alkanoic acid ester derivative is obtained and this intermediate is saponified by treatment with an aqueous solution of an alkali metal hydroxide, carbonate, etc. followed by treatment with an acid to yield the corresponding 2-(4-halophenoxy)alkanoic acid (III). The acid (III) thus obtained may then be isolated for use as a starting material in one of the two alternate methods described above for the preparation of the instant products (I) or, if desired, the said acid (III) may be converted to its corresponding acid halide (II) by treatment with an halogenating agent. Suitable halogenating agents include, for example, thionyl chloride, phosphorus trichloride, phosphorus oxychloride, etc. The following equations, wherein the halogenating agent employed is phosphorus oxychloride, illustrate both the method for the preparation of the 2-(4-halophenoxy)alkanoic acid derivatives (III) and the corresponding 2-(4-halophenoxy)alkanoic acid halides (II):

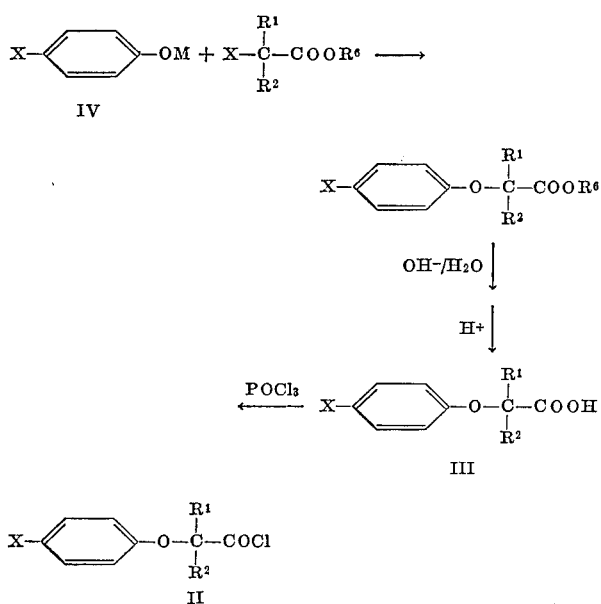

wherein $R^6$ is lower alkyl; $OH^-$ is the anion derived from a base such as sodium or potassium hydroxide, etc.; $H^+$ is the cation derived from an organic or inorganic acid such as hydrochloric acid; M is the cation derived from an alkali metal hydroxide or carbonate, etc. such as the cation derived from sodium hydroxide, sodium carbonate, potassium hydroxide, etc.; and $R^1$, $R^2$, X and $X^1$ are as defined above.

An alternate method for the preparation of the 2-(4-halophenoxy)alkanoic acid reactants consists in the reaction of a suitable phenol with a lower alkyl ketones or cyclohexanone and chloroform in the presence of a strong base followed by neutralization with an acid according to the following equation:

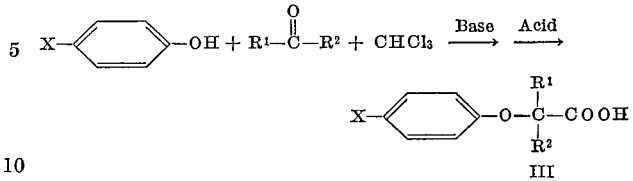

wherein $R^1$, $R^2$ and X are as defined above. Suitable bases and acids which may be used in the process include, for example, sodium hydroxide, potassium hydroxide, hydrochloric acid, sulfuric acid, etc. Also, if desired, the 2-(4-halophenoxy)alkanoic acid compound (III) thus obtained may be converted to its corresponding acid halide in the manner described above for the preparation of the 2-(4-halophenoxy)alkanoic acid halide reactants (II) by treatment with a suitable halogenating agent.

There is no clear agreement about the actual role of cholesterol and triglyceride synthesis in the localization of atherosclerotic plaques, but numerous studies support the concept that cholesterol and triglycerides play a major role in the pathogenesis of atherosclerosis because along with other lipids and fibrin they accumulate in the arterial intima and subintima and produce arterial corrosion.

Since cholesterol and triglycerides are present to some extent in all ordinary diets and since they are also synthesized by body organs from intermediates of metabolic origin, the development of some chemotherapeutic agent which will induce a significant reduction in the serum cholesterol and triglyceride level has been found desirable. To this end the 2-(4-halophenoxy)alkanoic acid esters of this invention were synthesized, tested and found to exhibit good hypocholesterolemic and hypolipemic activity.

The examples which follow illustrate the 2-(4-halophenoxy)alkanoic acid esters (I) of this invention and the methods by which they are prepared. However, the examples are illustrative only and it will be apparent to those having ordinary skill in the art that all of the instant products may be prepared in an analogous manner by substituting the appropriate starting materials for those set forth in the examples.

EXAMPLE 1

2-ureidoethyl 2-(4-chlorophenoxy)-2-methylpropionate

A solution of 2-(4-chlorophenoxy)-2-methylpropionyl chloride (11.65 g., 0.05 mole) in 35 ml. of ether is added with stirring over a 40-minute period to a solution of 2-hydroxyethylurea (5.20 g., 0.05 mole) in dimethylformamide (60 ml.) containing 4.4 ml. of pyridine. The temperature is maintained at 0° C. throughout the addition and for an additional hour with stirring. Stirring is then continued for 18 hours at 23–25° C. and then water (350 ml.) and ether (75 ml.) are added and, after thorough agitation, the ether layer is separated. The aqueous layer is extracted again with ether (100 ml.) and the ether extracts are combined and washed with aqueous sodium bicarbonate solution and water. Evaporation of the ether solution under vacuum yields 8.6 g. of a crystalline residue, M.P. 53–65° C. Recrystallization from toluene yields pure 2-ureidoethyl 2-(4-chlorophenoxy)-2 - methylpropionate, M.P. 79–80.5° C.

*Analysis*—Calculated for $C_{13}H_{17}ClN_2O_4$ (percent): C, 51.92; H, 5.70; N, 9.32. Found (percent): C, 52.06; H, 5.71; N, 9.24.

EXAMPLE 2

2-acetamidoethyl 2-(4-chlorophenoxy)-2-methylpropionate

By substituting 2-acetamidoethanol (5.16 g., 0.05 mole) for the 2-hydroxyethylurea of Example 1 and conducting the reaction under the same conditions and with the same quantities of 2-(4 - chlorophenoxy) - 2 - methylpropionyl chloride, dimethylformamide, pyridine and ether as described therein there is obtained 9.6 g. of crude product, M.P. 37–43° C. Recrystallization from isopropyl ether yields pure 2-acetamidoethyl 2 - (4 - chlorophenoxy) - 2 - methylpropionate, M.P. 53.5–55.5° C.

Analysis.—Calculated for $C_{14}H_{18}ClNO_4$ (percent): C, 56.09; H, 6.05; N, 4.67. Found (percent): C, 56.41; H, 5.91; N, 4.65.

EXAMPLE 3

2-benzamidoethyl 2-(4-chlorophenoxy-2-methylpropionate

By substituting 2-benzamidoethanol (8.26 g., 0.05 mole) for the 2-hydroxyethylurea of Example 1 and conducting the reaction under the same conditions and with the same quantities of 2-(4 - chlorophenoxy) - 2 - methylpropionyl chloride, dimethylformamide, pyridine and ether as described therein there is obtained 14.4 g. of impure product, M.P. 54–60° C. Recrystallization from isopropyl ether yields 11.6 g. of pure 2-benzamidoethyl 2-(4-chlorophenoxy)-2-methylpropionate, M.P. 64.5–66° C.

Analysis.—Calculated for $C_{19}H_{20}ClNO_4$ (percent): C, 63.07; H, 5.57; N, 3.87. Found (percent): C, 63.38; H, 5.50; N, 3.68.

EXAMPLE 4

Phenacyl 2-(4-chlorophenoxy)-2-methylpropionate 2-(4-chlorophenoxy)-2-methylpropionic acid (10.7 g., 0.05 mole) is added to a solution of sodium methoxide (2.7 g., 0.05 mole) in 75 ml. of methanol. Phenacyl bromide (9.95 g., 0.05 mole) in 35 ml. of methanol is added and the mixture is heated under reflux for five hours. The solvent is removed under reduced pressure and water (100 ml.) and ether (200 ml.) are added to the residue. The ether layer is separated, washed with aqueous bicarbonate and then with water and then dried. The ether is evaporated under reduced pressure to give 15.5 g. of a crystalline residue, M.P. 73–78° C. Recrystallization from isopropyl alcohol yields 11.1 g. of phenacyl 2-(4-chlorophenoxy)-2-methylpropionate, M.P. 84–86° C.

Analysis.—Calculated for $C_{18}H_{17}ClO_4$ (percent): C, 64.96; H, 5.15. Found (percent): C, 65.31; H, 5.10.

EXAMPLE 5

2-(1-ethyl-3-ureido)ethyl 2-(4-chlorophenoxy)-2-methylpropionate

By substituting 1-ethyl-3-(2-hydroxyethyl)urea (6.61 g., 0.05 mole) for the 2-hydroxyethylurea of Example 1 and conducting the reaction under the same conditions and with the same quantities of 2-(4-chlorophenoxy)-2-methylpropionyl chloride, dimethylformamide, pyridine and ether as described therein there is obtained 12.6 g. of crude product, M.P. 71–75° C. Recrystallization from n-butyl chloride yields pure 2-(1-ethyl-3-ureido)ethyl 2 - (4 - chlorophenoxy)-2-methylpropionate, M.P. 77–79° C.

Analysis.—Calculated for $C_{15}H_{21}ClN_2O_4$ (percent): C, 54.79; H, 6.44; N, 8.52. Found (percent): C, 55.04; H, 6.14; N, 8.49.

In a manner similar to that described in Example 1 for the preparation of 2-ureidoethyl 2-(4-chlorophenoxy)-2-methylpropionate all of the products of this invention may be obtained. Thus, by substituting the appropriate 2-(4-halophenoxy)alkanoic acid halide and alkanol for the 2-(4-chlorophenoxy)-2-methylpropionyl chloride and 2-hydroxyethylurea recited in Example 1 and conducting the reaction under the same conditions and with the same molar quantities of reactants, including the same molar quantities of dimethylformamide, pyridine and ether, as described therein all of the 2-(4-halophenoxy)alkanoic acid esters (I) of this invention may be obtained. The following equation illustrates the reaction of Example 1 and, together with Table I, depict the starting materials of the instant process and the products (I) derived therefrom:

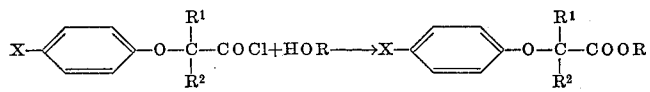

TABLE I

| Ex. | R | R¹ | R² | X |
|---|---|---|---|---|
| 6 | —CH₂—CH₂—NHCOH | —CH₃ | —CH₃ | Cl |
| 7 | —CH₂—CH₂—CH₂—CH₂—NHCOCH₃ | —CH₃ | —C₂H₅ | Cl |
| 8 | —CH₂—CH₂—CH₂—NHCO—⟨⟩ | —CH₂—(CH₂)₃—CH₂— | | Cl |
| 9 | —CH—CH₂—NHCONH₂ <br> \|<br>CH₃ | —CH₃ | —CH₃ | Cl |
| 10 | —CH₂—CH₂—CH₂—NHCONHC₂H₅ | —CH₃ | —C₂H₅ | Cl |
| 11 | —CH₂—CH₂—NHCOCH₂—CH₃ | —CH₂—(CH₂)₃—CH₂— | | Cl |
| 12 | —CH₂—CO—⟨⟩—Br | —CH₃ | —CH₃ | Br |
| 13 | —CH₂—CO—⟨⟩—Cl | —CH₂ | —CH₃ | Cl |
| 14 | —CH₂—NH—CO—N(CH₃)₂ | —CH₃ | —C₂H₅ | Cl |

Also, in a manner similar to that described in Example 4 for the preparation of phenacyl 2-(4-chlorophenoxy)-2-methylpropionate all of those products of the invention which are substituted in the alkanol portion of the molecule by a benzoyl moiety may be obtained. Thus, by substituting the appropriate 2-(4-halophenoxy)alkanoic acid and phenacyl halide or mononuclear substituted phenacyl halide for the 2-(4-chlorophenoxy)-2-methylpropionic acid and phenacyl bromide recited in Example 4 and conducting the reaction under the same conditions and with the same molar quantities of reactants, including the same molar quantities of sodium methoxide and methanol, as described therein all of the phenacyl 2-(4-halophenoxy)alkanoate products (Ib) of this invention may be obtained. The following equation illustrates the reaction of Example 4 and, together with Table II, depict the starting materials of the process and the products (Ib) derived therefrom:

unit dosage from or to combine one or more of the compounds with other known hypocholesterlemics and hypolipemics or with other desired therapeutic and/or nutritive agents in dosage unit form.

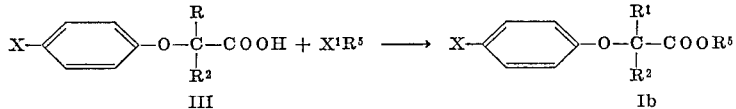

TABLE II

| Ex. | $R^1$ | $R^2$ | $R^5$ | X | $X^1$ |
|---|---|---|---|---|---|
| 15 | —CH$_3$ | —CH$_3$ | —CH$_2$—CO—⟨C$_6$H$_4$⟩—Cl | Br | Br |
| 16 | —CH$_3$ | —C$_2$H$_5$ | —CH$_2$—CO—⟨C$_6$H$_5$⟩ | Cl | Br |
| 17 | —CH$_3$ | —CH$_3$ | —CH$_2$—CO—⟨C$_6$H$_4$⟩—Br | Br | Cl |
| 18 | —CH$_3$ | —C$_2$H$_5$ | —CH$_2$—CO—⟨C$_6$H$_4$⟩—Br | Cl | F |
| 19 | —CH$_2$—(CH$_2$)$_3$—CH$_2$— | | —CH$_2$—CO—⟨C$_6$H$_4$⟩—OCH$_3$ | Cl | Br |
| 20 | —CH$_3$ | —CH$_3$ | —CH$_2$—CO—⟨C$_6$H$_4$⟩—OCH$_3$ | Br | Br |
| 21 | —CH$_3$ | —C$_2$H$_5$ | —CH$_2$—CO—⟨C$_6$H$_4$⟩—CH$_3$ | Cl | Br |
| 22 | —CH$_3$ | —C$_2$H$_5$ | —CH$_2$—CO—⟨C$_6$H$_4$⟩—OCH$_3$ | Cl | Br |
| 23 | —CH$_2$—(CH$_2$)$_3$—CH$_2$— | | —CH$_2$—CO—⟨C$_6$H$_4$⟩—OCH$_3$ | Cl | Cl |

The products of this invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 50 mg. of a suitable 2-(4-halophenoxy)alkanoic acid ester (I) with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a The following example is included to illustrate the preparation of a representative dosage form:

EXAMPLE 24

Dry-filled capsules containing 50 mg. of active ingredient per capsule

| | Per capsule, mg. |
|---|---|
| 2-acetamidoethyl 2 - (4-chlorophenoxy)-2-methylpropionate | 50 |
| Lactose | 144 |
| Magnesium stearate | 6 |
| Capsule size No. 3 | 200 |

The 2-acetamidoethyl 2 - (4-chlorophenoxy)-2-methylpropionate is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the 2-(4-halophenoxy)alkanoic acid esters (I) of this invention and their salts constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound having the formula:

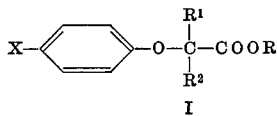

I wherein R is lower alkanamido substituted lower alkyl, benzamido substituted lower alkyl, phenacyl, nuclear substituted phenacyl wherein the nuclear substituent is halogen, lower alkyl or lower alkoxy, ureido substituted lower alkyl, N'-lower alkyl-ureido substituted lower alkyl or N',N'-di-lower alkyl-ureido substituted lower alkyl; $R^1$ and $R^2$ are the same or different lower alkyl radicals or, taken together with the carbon atom to which they are attached, $R^1$ and $R^2$ may be joined to form a six-membered cycloalkyl ring and X is halogen.

2. A compound according to claim 1 wherein R is lower alkanamido substituted lower alkyl or ureido substituted lower alkyl.

3. A compound according to claim 1 having the following general formula:

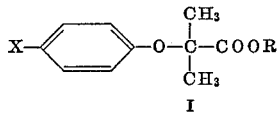

I wherein R is lower alkanamido substituted lower alkyl or ureido substituted lower alkyl and X is halogen.

4. The compound of claim 3 wherein R is 2-acetamidoethyl and X is chloro.

5. The compound of claim 3 wherein R is 2-ureidoethyl and X is chloro.

6. The compound of claim 1 wherein R is 2-benzamidoethyl; and $R^1$ and $R^2$ are methyl and X is chloro.

7. The compound of claim 1 wherein R is 2-(1-ethyl-3-ureido)ethyl; $R^1$ and $R^2$ are methyl and X is chloro.

8. The compound of claim 1 wherein R is 2-propionamidoethyl; $R^1$ and $R^2$ taken together represent pentamethylene and X is chloro.

References Cited

UNITED STATES PATENTS

| | | | |
|---|---|---|---|
| 3,148,207 | 9/1964 | Weinkauff et al. | 260—475 |
| 3,439,018 | 4/1969 | Brookes et al. | 260—473 |

OTHER REFERENCES

Morrison et al., "Organic Chemistry," Allyn & Bacon, Boston, 1965, p. 474.

LORRAINE A. WEINBERGER, Primary Examiner

D. STENZEL, Assistant Examiner

U.S. Cl. X.R.

424—308